US012688136B2

(12) United States Patent
Rogers

(10) Patent No.: US 12,688,136 B2
(45) Date of Patent: Jul. 21, 2026

(54) USB HUB WITH CIRCUITRY TO IDENTIFY AND STORE DEVICE RESPONSE DATA

(71) Applicant: Microchip Technology Incorporated, Chandler, AZ (US)

(72) Inventor: Andrew Rogers, Tempe, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/759,247

(22) Filed: Jun. 28, 2024

(65) Prior Publication Data

US 2025/0315397 A1    Oct. 9, 2025

Related U.S. Application Data

(60) Provisional application No. 63/631,504, filed on Apr. 9, 2024.

(51) Int. Cl.
 *G06F 13/40* (2006.01)
 *G06F 13/362* (2006.01)
 *G06F 13/38* (2006.01)
 *G06F 13/42* (2006.01)

(52) U.S. Cl.
 CPC ........ *G06F 13/4022* (2013.01); *G06F 13/362* (2013.01); *G06F 13/382* (2013.01)

(58) Field of Classification Search
 CPC ............................ G06F 13/387; G06F 13/4045
 See application file for complete search history.

(56) References Cited

U.S. PATENT DOCUMENTS

| | | | | |
|---|---|---|---|---|
| 2009/0248904 A1* | 10/2009 | Takamoto | ........... | G06F 13/4045 710/8 |
| 2012/0054373 A1* | 3/2012 | Tamura | ................. | G06F 13/387 710/14 |
| 2012/0311207 A1* | 12/2012 | Powers | ................. | G06F 13/385 710/106 |
| 2013/0054866 A1* | 2/2013 | Saito | ....................... | G06F 1/325 710/313 |
| 2013/0097340 A1* | 4/2013 | Chen | ..................... | G06F 13/102 710/10 |
| 2013/0151749 A1 | 6/2013 | Lai et al. | ....................... | 710/313 |
| 2013/0254440 A1* | 9/2013 | Toivanen | ................ | G06F 13/10 710/63 |

(Continued)

OTHER PUBLICATIONS

International Search Report and Written Opinion, Application No. PCT/US2024/050193, 11 pages, Dec. 9, 2024.

*Primary Examiner* — Getente A Yimer
(74) *Attorney, Agent, or Firm* — SLAYDEN GRUBERT BEARD PLLC

(57) ABSTRACT

An apparatus comprises an upstream hub port, a plurality of downstream hub ports, a hub controller, a device response memory accessible to the hub controller, and a routing system connecting (a) the upstream hub port to the plurality of downstream hub ports and (b) respective downstream hub ports to the hub controller. The routing system to communicate device responses from respective downstream hub ports to the hub controller. The hub controller includes hub controller circuitry to identify specified device data in a respective device response received from a respective downstream hub port, and store the specified device data in the device response memory.

20 Claims, 6 Drawing Sheets

(56) References Cited

U.S. PATENT DOCUMENTS

| | | | |
|---|---|---|---|
| 2014/0143459 A1* | 5/2014 | Yang .................... | G06F 13/385 |
| | | | 710/60 |
| 2016/0299865 A1 | 10/2016 | Hetzler et al. ............... | 710/105 |
| 2018/0067875 A1 | 3/2018 | Ghosh et al. | |
| 2020/0151129 A1* | 5/2020 | Wright ................. | G06F 1/3287 |

* cited by examiner

400

| ENTRY | TYPE | ADDR | ENDP | PACKET ID (PID) | LENGTH | DATA |
|---|---|---|---|---|---|---|
| 1 | DATA | 1 | 0 | DATA0 (0xC3) | 4 BYTES | 0x12 34 56 78 |
| 2 | DATA | | | DATA0 (0xC3) | 6 BYTES | 0x55 55 55 55 55 55 |
| 3 | HANDSHAKE | | | NAK | 0 | |

FIG. 4

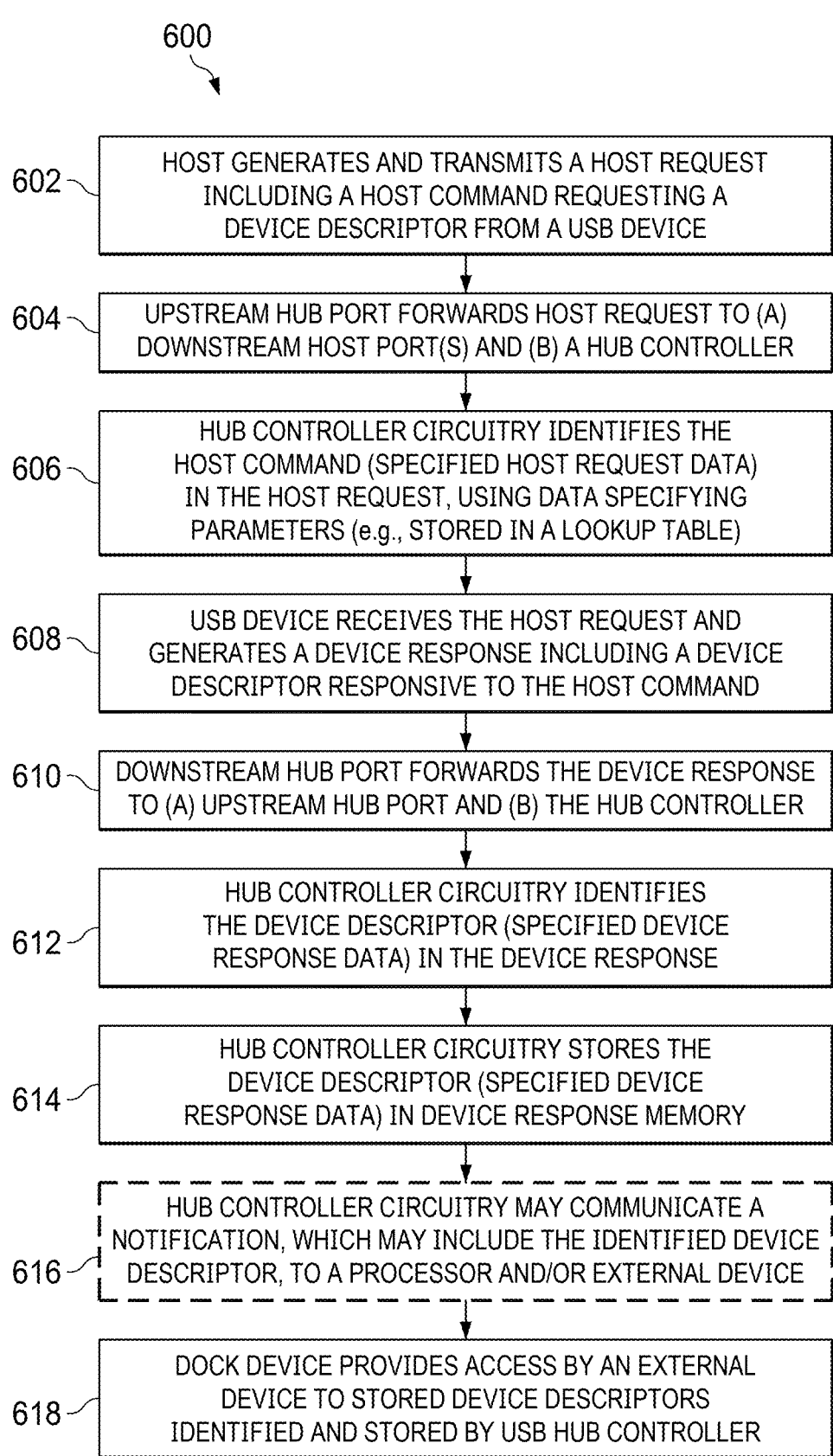

600

602 — HOST GENERATES AND TRANSMITS A HOST REQUEST INCLUDING A HOST COMMAND REQUESTING A DEVICE DESCRIPTOR FROM A USB DEVICE

604 — UPSTREAM HUB PORT FORWARDS HOST REQUEST TO (A) DOWNSTREAM HOST PORT(S) AND (B) A HUB CONTROLLER

606 — HUB CONTROLLER CIRCUITRY IDENTIFIES THE HOST COMMAND (SPECIFIED HOST REQUEST DATA) IN THE HOST REQUEST, USING DATA SPECIFYING PARAMETERS (e.g., STORED IN A LOOKUP TABLE)

608 — USB DEVICE RECEIVES THE HOST REQUEST AND GENERATES A DEVICE RESPONSE INCLUDING A DEVICE DESCRIPTOR RESPONSIVE TO THE HOST COMMAND

610 — DOWNSTREAM HUB PORT FORWARDS THE DEVICE RESPONSE TO (A) UPSTREAM HUB PORT AND (B) THE HUB CONTROLLER

612 — HUB CONTROLLER CIRCUITRY IDENTIFIES THE DEVICE DESCRIPTOR (SPECIFIED DEVICE RESPONSE DATA) IN THE DEVICE RESPONSE

614 — HUB CONTROLLER CIRCUITRY STORES THE DEVICE DESCRIPTOR (SPECIFIED DEVICE RESPONSE DATA) IN DEVICE RESPONSE MEMORY

616 — HUB CONTROLLER CIRCUITRY MAY COMMUNICATE A NOTIFICATION, WHICH MAY INCLUDE THE IDENTIFIED DEVICE DESCRIPTOR, TO A PROCESSOR AND/OR EXTERNAL DEVICE

618 — DOCK DEVICE PROVIDES ACCESS BY AN EXTERNAL DEVICE TO STORED DEVICE DESCRIPTORS IDENTIFIED AND STORED BY USB HUB CONTROLLER

FIG. 6

USB HUB WITH CIRCUITRY TO IDENTIFY AND STORE DEVICE RESPONSE DATA

RELATED APPLICATION

This application claims priority to commonly owned U.S. Provisional Patent Application No. 63/631,504 filed Apr. 9, 2024, the entire contents of which are hereby incorporated by reference for all purposes.

TECHNICAL FIELD

The present disclosure relates to USB devices, and more particularly to a USB hub with circuitry to identify and store device response data, and associated methods.

BACKGROUND

A typical Universal Serial Bus (USB) hub provides connection between a host (e.g., a PC or laptop) to one or multiple USB devices (e.g., one or more of a mouse, keyboard, video monitor, speaker, or headset, without limitation). The USB hub may include an upstream port connected to the host, and multiple downstream ports connected to respective USB devices. The USB hub may also include a hub controller for controlling various functions of the USB hub. In some USB hubs, the hub controller may be connected to a processor (e.g., a microcontroller, SoC, FPGA, without limitation), which may be accessible by an external entity (distinct from the host), for example via a WiFi or Ethernet connection.

The upstream port (to which the host may be connected), the downstream ports (to which respective USB devices may be connected), and the hub controller may be connected by a routing system referred to as a "routing logic." In a conventional USB hub, the routing logic connects the upstream port to each downstream port, and also connects the upstream port to the hub controller. During operation, a host connected to the upstream port sends "USB host requests" to respective USB devices connected to respective downstream ports, and the respective USB devices may return "USB device responses" when appropriate.

Different types of USB hubs, for example, USB2 hubs and USB3 hubs, include different routing logics for routing respective USB host requests and USB device responses. For example, in a USB2 hub implementing conventional USB2 routing logic, a USB host request originating from a host and intended for a target USB device (selected from multiple connected USB devices) is forwarded to all connected USB devices (via respective downstream ports) and to the hub controller, and respective USB devices may determine whether the USB host request is intended for that device, and if so, respond accordingly. Alternatively, in a USB3 hub implementing conventional USB3 routing logic, a USB host request originating from a host and intended for a target USB device is forwarded only to the target USB device (via a respective device port of the USB hub, which may be referred to as a target device port) and to the hub controller.

In both USB2 and USB3 hubs, the target USB device may generate a USB device response in response to the received USB host request, which USB device response is forwarded only to the host, and not forwarded to the hub controller. In other words, according to conventional USB2 and USB3 routing logic, the USB device response is routed in the USB hub from the target device port to the host port), but not to the hub controller.

However, in some situations there is a need or desire for the USB hub itself (apart from the host) to access and/or store a USB device response or selected information included in a USB device response. For example, a remote entity connected to the USB hub may wish to access any of various types of information included in respective USB device responses. For instance, an information technology (IT) entity remotely connected to the USB hub (for example via a WiFi/Ethernet connection to a processor connected to the USB hub controller) may wish to access USB device response information (e.g., device descriptors) for the purpose of identifying or monitoring which USB devices are connected to the USB hub, e.g., to identify a malicious or unauthorized device or type of device.

Existing techniques to obtain information from USB device responses suffer from various drawbacks. For example, some systems incorporate a software controlled "mini-host" in the USB host to act as a "middleman" for accessing and storing USB device response information. Such systems are often software intensive, slow (introducing delays to responsiveness), and/or require valuable silicon real estate (e.g., to provide a proxy hardware USB controller for each downstream device port).

There is a need for an improved USB hub with storage of USB device response information (e.g., device descriptors and/or other data), and associated methods.

SUMMARY

Examples of the present disclosure provide a USB hub with a routing system that routes both host requests (from a host device connected to the USB hub) and device responses (from respective USB devices connected to the USB hub) to a hub controller. The hub controller may include hub controller circuitry to identify specified information (e.g., USB device descriptors) in device responses communicated by respective USB devices, and store the identified device response data (e.g., device descriptors) in memory. Some examples provide suitable components (e.g., a processor and network interface) allowing external devices access to the device response data (e.g., device descriptors) identified and stored by the hub controller.

In some examples, to identify specified information (e.g., a device descriptor) in a device response, the hub controller circuitry may first identify specified information (e.g., a host command requesting a device descriptor) in a host request, and in response, identify the response to the host request (i.e., the requested device descriptor) in a corresponding device response from a USB device. In some example, the hub controller circuitry may identify the specified information (e.g., a specified type of host command) in a host request by identifying information in the host request that matches a set of data specifying parameters (e.g., listed in a programmable lookup table) stored in memory accessible to the host controller.

One aspect provides an apparatus including an upstream hub port, a plurality of downstream hub ports, a hub controller, a device response memory accessible to the hub controller, and a routing system connecting (a) the upstream hub port to the plurality of downstream hub ports, (b) the upstream hub port to the hub controller, and (c) respective downstream hub ports to the hub controller. The routing system to communicate host requests from the upstream hub port to (a) respective downstream hub ports and (b) the hub controller, and to communicate device responses from respective downstream hub ports to (a) the upstream hub port and (b) the hub controller, wherein respective device responses are responsive to respective host requests. The hub controller including hub controller circuitry to identify device response data in a respective device response received from a respective downstream hub port, and store the identified specified device response data in the device response memory.

In some examples, the apparatus includes a parameter memory storing a lookup table including data specifying parameters, and wherein the hub controller includes circuitry to use the data specifying parameters to identify specified host request data in a respective host request, and identify the device response data in the respective device response in response to identifying the specified host request data in the respective host request.

In some examples, the apparatus comprises a USB2 hub.

In some examples, the apparatus comprises a USB3 hub.

In some examples, the apparatus includes a processor connected to the hub controller, the processor having access to the device response data stored in the device response memory.

In some examples, the apparatus includes a network interface connected to the processor, the network interface allowing access to the device response data independent from the upstream hub port and independent from the plurality of downstream hub ports.

In some examples, the processor comprises a microcontroller.

In some examples, the device response data comprises identification information of a USB device connected to the respective downstream hub port.

In some examples, the apparatus comprises a dock device including (a) a USB hub including the upstream hub port, the plurality of downstream hub ports, the hub controller, the device response memory accessible to the hub controller, and the routing system, and (b) a processor connected to the hub controller, the processor having access to the device response data stored in the device response memory.

One aspect provides an apparatus including a USB hub including an upstream hub port, a plurality of downstream hub ports, a hub controller, a memory accessible to the hub controller, and a routing system connecting (a) the upstream hub port to the plurality of downstream hub ports and (b) respective downstream hub ports to the hub controller. The routing system to communicate device responses from respective downstream hub ports to the hub controller, and the hub controller including hub controller circuitry to identify specified device data in a respective device response received from a respective downstream hub port, and store the specified device data in the device response memory.

In some examples, the hub controller circuitry to use data specifying parameters to identify specified host request data in a host request received from the upstream hub port, and identify the device response in the respective device response in response to identifying the specified host request data in the respective host request.

In some examples, the apparatus includes a processor connected to the hub controller, the processor having access to the specified device data stored in the device response memory, and a network interface connected to the processor, the network interface allowing access to the specified device data.

In some examples, the processor has access to the specified device data stored in the memory independent from the upstream hub port and independent from the plurality of downstream hub ports.

In some examples, the processor comprises a microcontroller.

In some examples, the data comprises identification information of the USB device connected to the downstream hub port.

One aspect provides a method, including: receiving, at a downstream hub port of a Universal Serial Bus (USB) hub, a device response from a USB device connected to the downstream hub port, wherein the device response is responsive to a host request from a host connected to an upstream hub port of the USB hub; forwarding the device response from the downstream hub port to both (a) the upstream hub port and (b) a hub controller of the USB hub; identifying, by the hub controller, specified device response data in the device response; and storing the identified device response data in a device response memory connected to the hub controller.

In some examples, the method includes, prior to forwarding the device response, forwarding the host request from the upstream hub port to both (a) the downstream hub port and (b) the hub controller; and wherein identifying, by the hub controller, the specified device response data included in the device response comprises identifying, by the hub controller, specified host request data in the host request, and identifying the specified host request data in the device response in response to identifying the specified host request data in the host request.

In some examples, the method includes accessing the stored device response data by a microcontroller connected to the hub controller, and allowing access to the stored device response data, by the microcontroller, to a device connected to the microcontroller independent of the upstream hub port and the downstream hub port.

In some examples, the device response data comprises identification information of the USB device connected to the downstream hub port.

BRIEF DESCRIPTION OF THE DRAWINGS

Example aspects of the present disclosure are described below in conjunction with the figures, in which:

FIG. 4 shows an example programmable lookup table listing data specifying parameters usable by a hub controller to identify specified host request data in a respective host request, and in response, identify and store specified device response data (e.g., USB device descriptors) in respective device responses;

FIG. 6 shows an example method for identifying and storing specified device response data (e.g., a device descriptor) from a device response, and providing access to the stored device response data to an external device.

It should be understood that the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Figure 1:
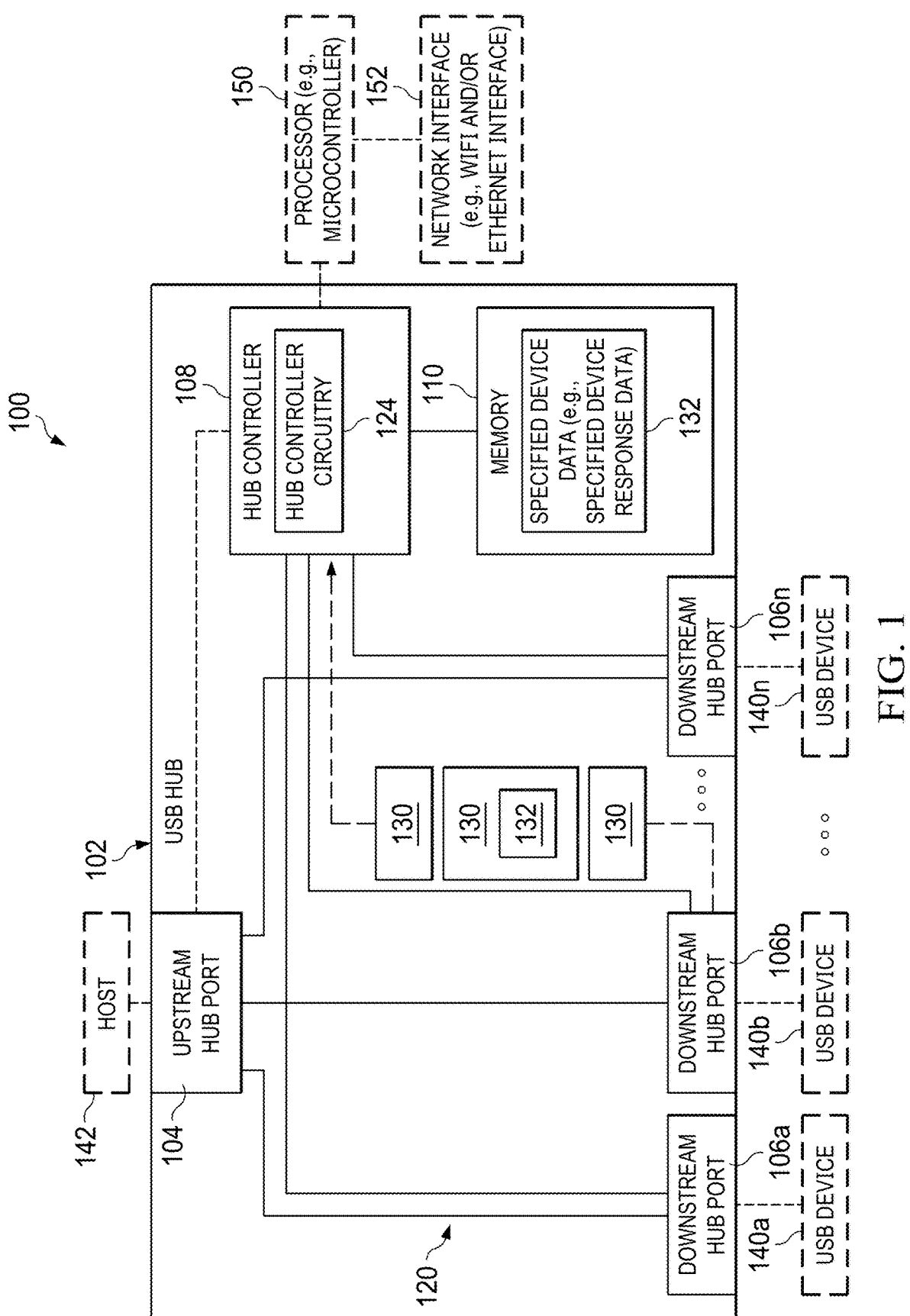
FIG. 1 shows an example apparatus comprising an example USB hub to identify and store specified device data received from respective USB device(s) connected to the USB hub.

FIG. 1 shows an example apparatus 100 comprising an example USB hub 102 to identify and store specified device data 132 received from respective USB device(s) 140 connected to the USB hub 102. The example USB hub 102 includes an upstream USB port (or "upstream hub port") 104, a plurality of downstream USB ports (or "downstream hub ports") 106a-106n, a hub controller 108, a memory 110 accessible to the hub controller 108, and a routing system 120.

The upstream hub port 104 may be connected to a host 142, e.g., a personal computer (PC), a laptop, a tablet computer, or other electronic device. The plurality of downstream hub ports 106a-106n may include any number of ports, for example, two, three, four, five, six, or more ports. Respective downstream hub ports 106a-106n may be connected to respective USB devices 140a-140n, for example one or more of a mouse, keyboard, video monitor, speaker, headset, or other type(s) of USB devices.

The routing system 120 may include circuitry and communication protocols (e.g., embodied in hardware, software and/or firmware) to connect the upstream hub port 104 with respective downstream hub ports 106a-106n, e.g., to allow communication (in the form of data packets) between the host 142 and respective USB devices 140a-140n. As shown, the routing system 120 may also include circuitry and communication protocols (e.g., embodied in hardware, software and/or firmware) to connect respective downstream hub ports 106a-106n to the hub controller 108, e.g., to allow communication (in the form of data packets) from respective downstream hub ports 106a-106n to the hub controller 108. FIG. 1 shows an example communication of data packets 130 from a respective downstream hub port 106b (e.g., originating from an example USB device 140 connected to the downstream hub port 106b) to the hub controller 108.

The hub controller 108 may include hub controller circuitry 124 to receive communications (e.g., data packets 130) from respective downstream hub ports 106a-106n, identify specified device data 132 in the received communications (e.g., data packets 130), and store the identified specified device data 132 in memory 110. In the example shown in FIG. 1, the hub controller circuitry 124 may identify specified device data 132 included in one or more data packets 130 received from downstream hub port 106b, and store the identified specified device data 132 in memory 110. Specified device data 132 may include one or more data packet 130 or transmission (including multiple data packets 130), or may include a partial portion or portions of a single data packet 130 or multiple data packets 130.

As used herein, specified device data 132 may be identified by the hub controller circuitry 124 using data specifying parameters. Data specifying parameters may be embodied in one or more lookup tables, lists, rule, or instructions, without limitation. Data specifying parameters may specify, for example, a specified type of USB transaction or packet, a specified packet address (e.g., as defined by a start point, end point, and/or length), a specified data format, a specified bit, series or bits, or pattern of bits, any other parameter(s), or any combination of the aforementioned.

In some examples, e.g., as discussed below with reference to FIG. 2, a host 142 may send communications ("host requests") to respective USB devices 140a-140n, and respective USB devices 140a-140n may send responses ("device responses") that are forwarded to the upstream hub port 104 (for delivery to the host 142) and also to the hub controller 108. Respective device responses may include specified device data 132, which specified device data 132 may be identified and stored by hub controller circuitry 124. In some examples, specified device data 132 received from a respective downstream hub port 106a-106n may include information identifying the respective downstream hub port 106a-106n and/or the respective USB device 140a-140n connected to the respective downstream hub port 106a-106n.

In some examples, the hub controller circuitry 124 may use data specifying parameters to identify particular host commands to identify in respective host requests. When the hub controller circuitry 124 identifies a particular host command in a respective host request (using respective data specifying parameters), the hub controller circuitry 124 may then identify a device response (e.g., comprising data packets 130 shown in FIG. 1) responsive to the host request, and store the device response or a portion thereof (for example a data payload responsive to the identified host command) as specified device data 132 in memory 110. Specified device data 132 identified in a device response may be referred to herein as device response data.

For example, with reference to FIG. 1, the data packets 130 may comprise a device response from the USB device 140b in response to a host request from host 142, wherein the downstream hub port 106b forwards the device response (data packets 130) to both the upstream hub port 104 (for delivery to the host 142) and the hub controller 108. The hub controller circuitry 124 may identify a particular host command in the host request (using respective data specifying parameters), and in response, identify a data payload (e.g., comprising a device descriptor for the USB device 140b) in the device response data packets 130, and store the identified data payload (e.g., device descriptor) as specified device data 132 in memory 110.

In some examples, the hub 102 may provide access to specified device data 132 (e.g., device response data) by an external device, for example to allow the external device to obtain information about USB devices 140a-140n connected to the hub 102. In some examples, the apparatus 100 may optionally include a processor 150 (e.g., a microcontroller or microprocessor) connected to the hub controller 108 and a network interface 152 (e.g., a WiFi transceiver or an Ethernet connection) connected to the processor 150. The processor 150 may have access to specified device data 132 stored in the memory 110, and the network interface 152 may allow access to the specified device data 132, e.g., by an external device.

Figure 2:
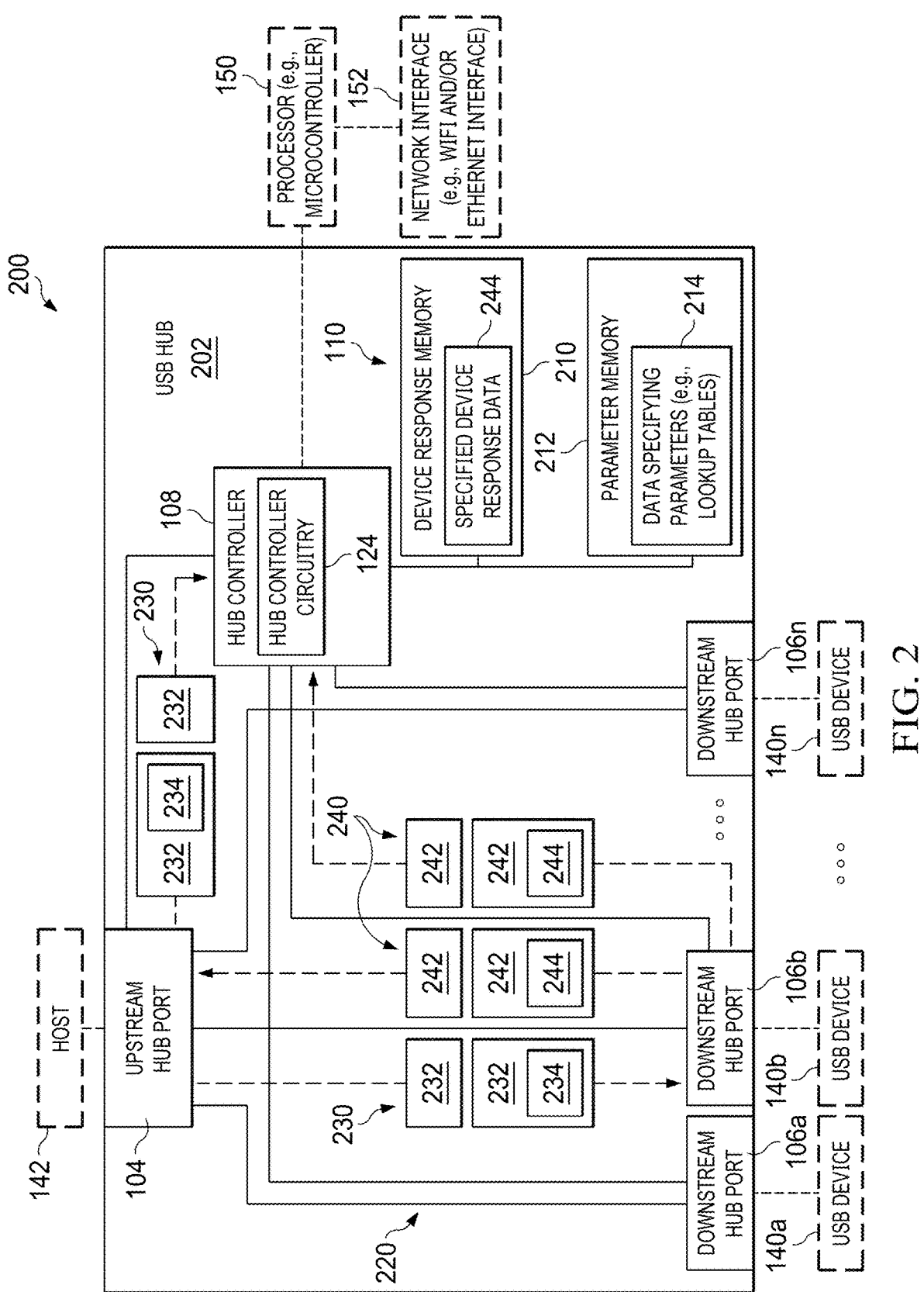
FIG. 2 shows an example apparatus comprising an example USB hub to identify and store specified device response data (e.g., USB device descriptors) received from respective USB device(s) connected to the USB hub.

FIG. 2 shows an example apparatus 200 comprising an example USB hub 202 to identify and store specified device response data 244 received from respective USB device(s) 140 connected to the USB hub 102. The example USB hub 202 may comprise an example implementation of the example USB hub 102 shown in FIG. 1 and discussed above. Accordingly, the example USB hub 202 may include upstream hub port 104, multiple downstream hub ports 106a-106n, hub controller 108, memory 110 accessible to the hub controller 108, and a routing system 220. In some examples, the example USB hub 202 may be implemented as a USB2 hub or a USB3 hub, as discussed below.

In some examples, the USB hub 202 may provide access to specified device response data 244 by an external device, for example to allow the external device to obtain information about USB devices 140a-140n connected to the USB hub 202. In some examples, the apparatus 200 may optionally include processor 150 (e.g., a microcontroller or microprocessor) connected to the hub controller 108, and network interface 152 (e.g., a WiFi transceiver or an Ethernet connection) connected to the processor 150, e.g., to allow access to the specified device response data 244 by an external device. In some examples, e.g., as discussed below with reference to FIG. 3, the apparatus 200 comprises a dock device including the USB hub 202, the processor 150, and network interface 152.

The routing system 220 of the example USB hub 202 may include circuitry and communication protocols (e.g., embodied in hardware, software and/or firmware) to (a) connect the upstream hub port 104 with respective downstream hub ports 106a-106n, e.g., to allow communication (in the form of data packets) from the host 142 to respective USB devices 140a-140n and vice versa, (b) connect the upstream hub port 104 with the hub controller 108, e.g., to allow communication of data packets from the host 142 to hub controller 108, and (c) connect respective downstream hub ports 106a-106n with the hub controller 108, e.g., to allow communication of data packets from the respective downstream hub ports 106a-106n to hub controller 108.

In some examples, the host 142 sends host requests 230 to respective USB devices 140a-140n, and respective USB devices 140a-140n send device responses 240 responsive to respective host requests 230. The routing system 220 forwards host requests 230 (originating from the host 142) from the upstream hub port 104 to (a) one or multiple downstream hub ports 106a-106n and (b) the hub controller 108. In examples in which the USB hub 202 is implemented as a USB2 hub, the routing system 220 may forward respective host requests 230 from the upstream hub port 104 to all downstream hub ports 106a-106n, wherein respective USB devices 140a-140n may determine whether respective host requests 230 are intended for that USB device 140a-140n (e.g., based on addressing information within the respective host requests 230) and generate device responses 240 accordingly. Alternatively, in examples in which the USB hub 202 is implemented as a USB3 hub, the routing system 220 may forward respective host requests 230 from the upstream hub port 104 to a respective downstream hub port 106a-106n connected to an intended target USB device 140a-140n of the respective host request 230 (e.g., as opposed to forwarding respective host requests 230 to all downstream hub ports 106a-106n as in a USB2 implementation).

The routing system 220 forwards respective device responses 240 (originating from respective USB devices 140a-140n) from respective downstream hub ports 106a-106n to (a) the upstream hub port 104 and (b) the hub controller 108, e.g., in both USB2 and USB3 implementations of the USB hub 202.

Thus, the hub controller 108 may inspect all downstream packets (from the host 142 to respective USB devices 140a-140n) and all upstream packets (from respective USB devices 140a-140n to the host 142) for targeted types of information. As discussed below, the hub controller may include circuitry (hardware, software and/or firmware) to identify predefined host commands included in respective host requests 230 (e.g., DATA and/or HANDSHAKE commands) and then identify (and store in memory 110) the corresponding data (specified device response data 244) included in respective device responses 240. As discussed below, the predefined host commands—for which the corresponding device responses are identified and stored—may be specified by a set of data specifying parameters 214 (e.g., embodied in a programmable lookup table) stored in memory 110 accessible to the hub controller 108.

FIG. 2 shows an example communication of (a) an example host request 230 (intended for USB device 140b) from the upstream hub port 104 to the downstream hub port 106b and the hub controller 108, and (b) an example device response 240 (responsive to the example host request 230) from the downstream hub port 106b to the upstream hub port 104 and the hub controller 108. The illustrated example may represent an example USB3 implementation, e.g., wherein the example host request 230 is forwarded to the downstream hub port 106b (connected to the target USB device 140b) but not the other downstream hub ports 106a, 106n. However, it should be understood in an example USB2 implementation the example host request 230 may be forwarded to all downstream hub ports 106a-106n, wherein respective USB devices 140a-140n may determine whether the host request 230 is intended for that USB device 140a-140n (e.g., based on addressing information in the host request 230).

As shown, the example host request 230 may include host request packets 232, e.g., provided in one or more USB transactions with the USB device 140b. The host request packets 232 may optionally include specified host request data 234, discussed below. The example device response 240 may include device response packets 242, e.g., provided in one or more USB transactions with the host 142. The device response packets 242 may include specified device response data 244. As discussed below, the hub controller circuitry 124 may identify the specified device response data 244 included in the device response 240 using respective data specifying parameters 214 (e.g., provided in a lookup table accessibly to the hub controller circuitry 124), and store the identified specified device response data 244 in device response memory 210.

Specified device response data 244 may include information of interest to external devices (e.g., external to apparatus 200). For example, specified device response data 244 may include information identifying one or more USB devices 140a-140n connected (e.g., currently or at a prior time) to the USB hub 202, for example to detect an unauthorized or malicious USB device connected to the USB hub 202. In some examples, specified device response data 244 may include a USB device descriptor for a respective USB device 140a-140n, which typically includes useful information regarding the respective USB device 140a-140n for the host 142. For example, a USB device descriptor may inform the host 142 how to communicate with the respective USB device 140a-140n, for example indicating a driver to be loaded by the host 142 (e.g., a standard/universal driver or a device-specific custom driver). The USB device descriptor for a respective USB device 140a-140n may include, for example, a device ID, device manufacturer information, a device version, and a device class of the respective USB device 140a-140n.

In some examples, to identify specified device response data 244 included in a respective device response 240, hub controller circuitry 124 may identify specified host request data 234 in a respective host request 230 using data specifying parameters 214, and in response to identifying the specified host request data 234, identify a response to the specified host request data 234 in the respective device response 240, and store the identified response as specified device response data 244 in device response memory 210. For example, the hub controller circuitry 124 may (a) use respective data specifying parameters 214 stored in parameter memory 212 to identify in a respective host request 230 a particular host command that requests a USB device descriptor from the USB device 140 (wherein such host command is referred to as specified host request data 234), and in response, (b) identify a response to the particular host command in a respective device response 240, and store at least a portion of the device response 240, or data responsive to the particular host command (e.g., a data payload within the respective device response 240) as specified device response data 244 in memory 110. In some examples, the USB hub 202 may include a hardware mechanism to store full device response packets 242 (that include specified device response data 244) within respective registers or buffers.

In some examples, e.g., certain USB2 implementations, respective host requests 230 and device responses 240 are communicated (and received at the hub controller 108) in a sequential request-response order. Accordingly, in such implementation, the hub controller circuitry 124 may identify and store the specified device response data 244 from the next-received device response 240 at the hub controller.

In other examples, e.g., certain USB3 implementations, respective host requests 230 and device responses 240 may be communicated (and received at the hub controller 108) in a non-sequential order, for example wherein a particular host request 230 intended for USB device 140a is sequentially followed by a device response 240 from USB device 140b (e.g., in response to a previously received host request 230). Accordingly, in such implementation, the hub controller circuitry 124, after identifying specified host request data 234 in a respective host request 230 intended for USB device 140b, first identifies the device response 240 from USB device 140b responsive to the respective host request 230 (e.g., as distinguished from device response(s) 240 that may be received at the hub controller 108 before (or simultaneous with) the device response 240 from USB device 140b. To identify the device response 240 responsive to the respective host request 230, the hub controller circuitry 124 may inspect a route string of the respective host request 230, and then identify a matching route string in the device response 240 responsive to the respective host request 230.

Memory 110 may include a device response memory 210 to store specified host request data 234 identified by hub controller circuitry 124, and a parameter memory 212 storing data specifying parameters 214. The device response memory 210 and parameter memory 212 may represent different memory devices or different regions of a common memory device. For example, device response memory 210 may parameter memory 212 may respectively comprise RAM, Flash memory, and/or other memory device(s). Hub controller circuitry 124 may access the parameter memory 212 to access data specifying parameters 214 for identifying specified device response data 244 in respective device responses 240, and may use the device response memory 210 to store identified specified device response data 244.

Data specifying parameters 214 may be used by hub controller circuitry 124 to identify specified host request data 234 included in respective host request packets 232 and/or to identify specified device response data 244 included in respective device response packets 242. For example, the hub controller circuitry 124 may analyze received host request packets 232 and device response packets 242 based on respective data specifying parameters 214, wherein data contained in respective host request packets 232 that matches the data specifying parameters 214 may be identified as specified host request data 234, which may be used by the hub controller circuitry 124 to locate and store specified device response data 244 responsive to specified host request data 234, as discussed herein. For example, specified host request data 234 identified in respective host request packet(s) 232 may comprise a host command requesting a USB device descriptor from a particular USB device 140a-140n, and the specified device response data 244 identified in device response packet(s) 242 responsive to the host request packet(s) 232 may comprise a data payload including the requested USB device descriptor.

Data specifying parameters 214 may specify various parameters commonly associated with host request packets 232 and/or device response packets 242, for example, a type of USB transaction or packet, a packet address (e.g., as defined by a start point, end point, and/or length), a data format, a specified bit, series or bits, or pattern of bits, any other parameter(s), or any combination of the aforementioned types of parameters. Data specifying parameters 214 may be embodied in any format, for example using one or more lookup tables, lists, rules, or instructions, without limitation.

Referring to the example shown in FIG. 2, the hub controller circuitry 124 may include circuitry (e.g., embodied in software and/or firmware) to receive a host request 230 (intended for USB device 140b) including host request packets 232 from the upstream hub port 104, and analyze the host request packets 232 using respective data specifying parameters 214 to identify specified host request data 234, for example a host command requesting a USB device descriptor from the USB device 140b. In response to identifying the specified host request data 234, the hub controller circuitry 124 may enable or allocate a buffer or other memory location in the device response memory 210 for storing the response to the specified host request data 234 from the USB device 140b, for example a USB device descriptor for the USB device 140b. Upon receiving the corresponding device response 240 from the downstream hub port 106b, the hub controller circuitry 124 may analyze the device response packets 242 using data specifying parameters 214 (e.g., specifying the address, length, etc. of the USB device descriptor in the device response packets 242) to identify the USB device descriptor and store the USB device descriptor as specified device response data 244 in enabled/allocated buffer or memory location in the device response memory 210.

In other examples, data specifying parameters 214 may be used by hub controller circuitry 124 to identify specified device response data 244 in response to respective host requests 230 independent of associated host requests 230 (e.g., without identifying specified host request data 234). In such examples, the hub controller circuitry 124 may include circuitry (e.g., embodied in software and/or firmware) to receive a device response 240 (responsive to a respective host request 230) including device response packets 242 from the downstream hub port 106b, analyze the device response packets 242 using respective data specifying parameters 214 to identify specified device response data 244 (e.g., a USB device descriptor for the USB device 140b), and store the identified specified device response data 244 in a respective location in the device response memory 210.

In some examples, the hub controller circuitry 124 may store context-adding data along with specified device response data 244 (e.g., a data payload contained in a "Data" segment of a device response packet 242), to provide context to the specified device response data 244. Such context-adding data may be useful, for example, to an external device accessing the specified device response data 244. Such context-adding data may include metadata or other data associated with the specified device response data 244. For example, context-adding data may include (a) a look-up table reference identifying an entry in a lookup table that triggered the identification of the specified device response data 244 (e.g., a lookup table entry that triggered the identification of specified host request data 234 to which the specified device response data 244 was responsive), (b) a port ID of the downstream hub port 106a-106n from which the specified device response data 244 was received, (c) an address or route string of the USB device 140a-140n from which the specified device response data 244 was received, (d) a packet number in which the specified host request data 234 was contained (e.g., in the event multiple device response packets 242 were included in the relevant device response 240, (e) a response size of the relevant device response 240 (e.g., indicating the number of packets in the device response 240), and/or any other relevant information.

Figure 3:
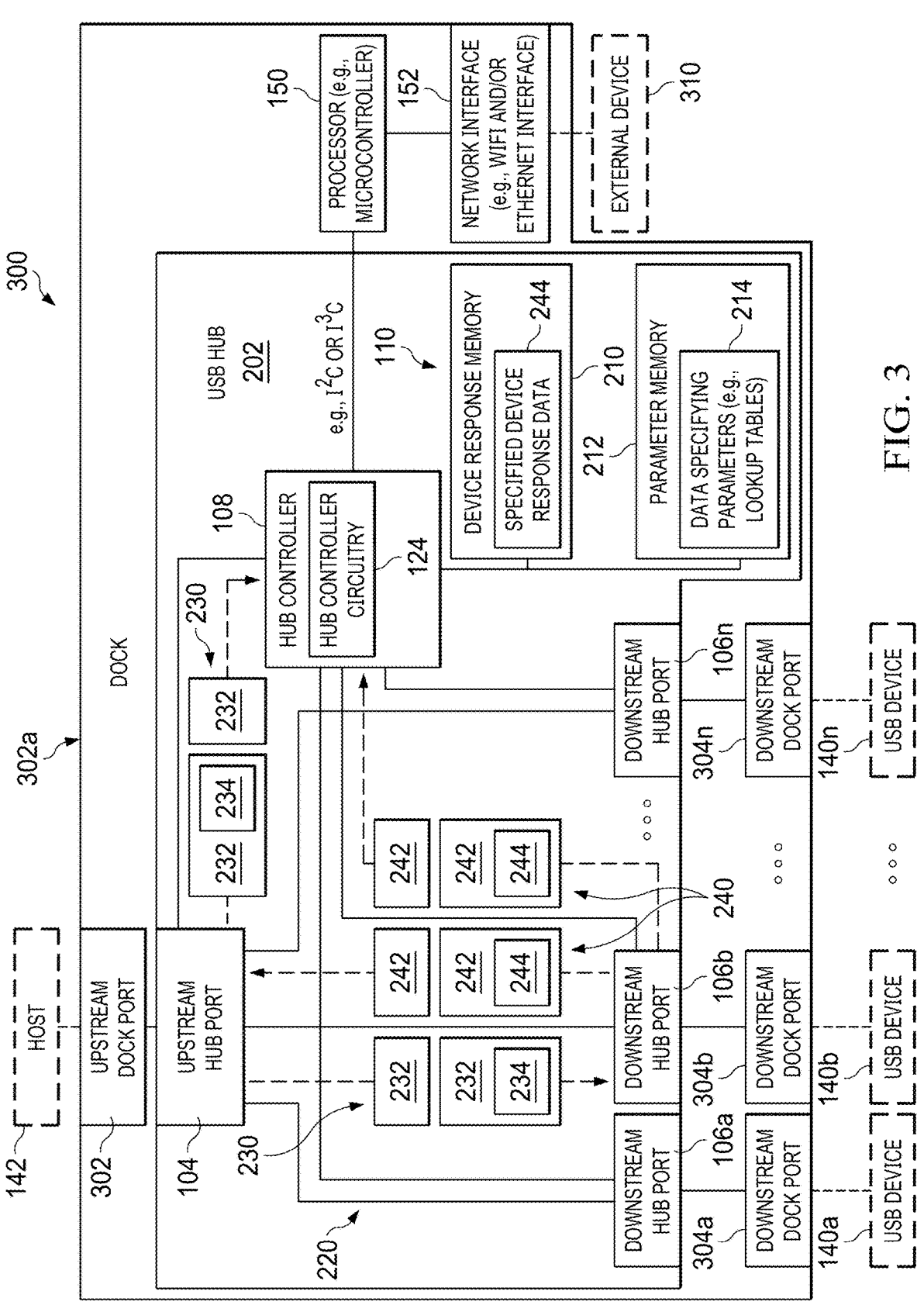
FIG. 3 shows an example dock device apparatus comprising the example USB hub shown in FIG. 2, and a processor and network interface to provide access by an external device to specified device response data (e.g., USB device descriptors) identified by the USB hub.

FIG. 3 shows an example dock device 300 apparatus 200 comprising the example USB hub 202 shown in FIG. 2, processor 150, and network interface 152 to identify and store specified device response data 244 received from respective USB device(s) 140a-140n, and provide access to the stored specified device response data 244 by an external device 310, e.g., via the network interface 152. In some examples, the processor 150 comprises a microcontroller connected to the hub controller 108 by an I²C or I3C connection.

As shown, the dock device 300 may include an upstream dock port 302 connected to the upstream hub port 104 of the USB hub 202, and a plurality of downstream dock ports 304a-304n respectively connected to downstream hub ports 106a-106n of the USB hub 202. The upstream dock port 302 may be connected to the host 142, and respective downstream dock ports 304a-304n may be connected to respective USB devices 140a-140n. The dock device 300 may include any other type(s) of interfaces for connecting various peripherals or other devices.

FIG. 4 shows an example of a programmable lookup table 400 listing data specifying parameters 214 usable by hub controller circuitry 124 to identify specified host request data 234 in a respective host request 230, wherein the hub controller circuitry 124 may then identify and store a response to the specified host request data 234 in a respective device response 240 (i.e., wherein the response may be stored as specified device response data 244 in device response memory 210). The example programmable lookup table 400 may be stored in parameter memory 212 accessible to hub controller 108.

The example programmable lookup table 400 includes three example entries, wherein the table 400 specifies for a respective entry, some or all of the following data specifying parameters 214: a type of host command (e.g., a DATA or HANDSHAKE command), an address, and endpoint, a packet ID (PID), a length of the data payload to watch for, and a data format of binary or hexadecimal. It should be understood that the data specifying parameters 214 listed in the example programmable lookup table 400 are examples only, and any other suitable data specifying parameters 214 may be used.

Figure 5:
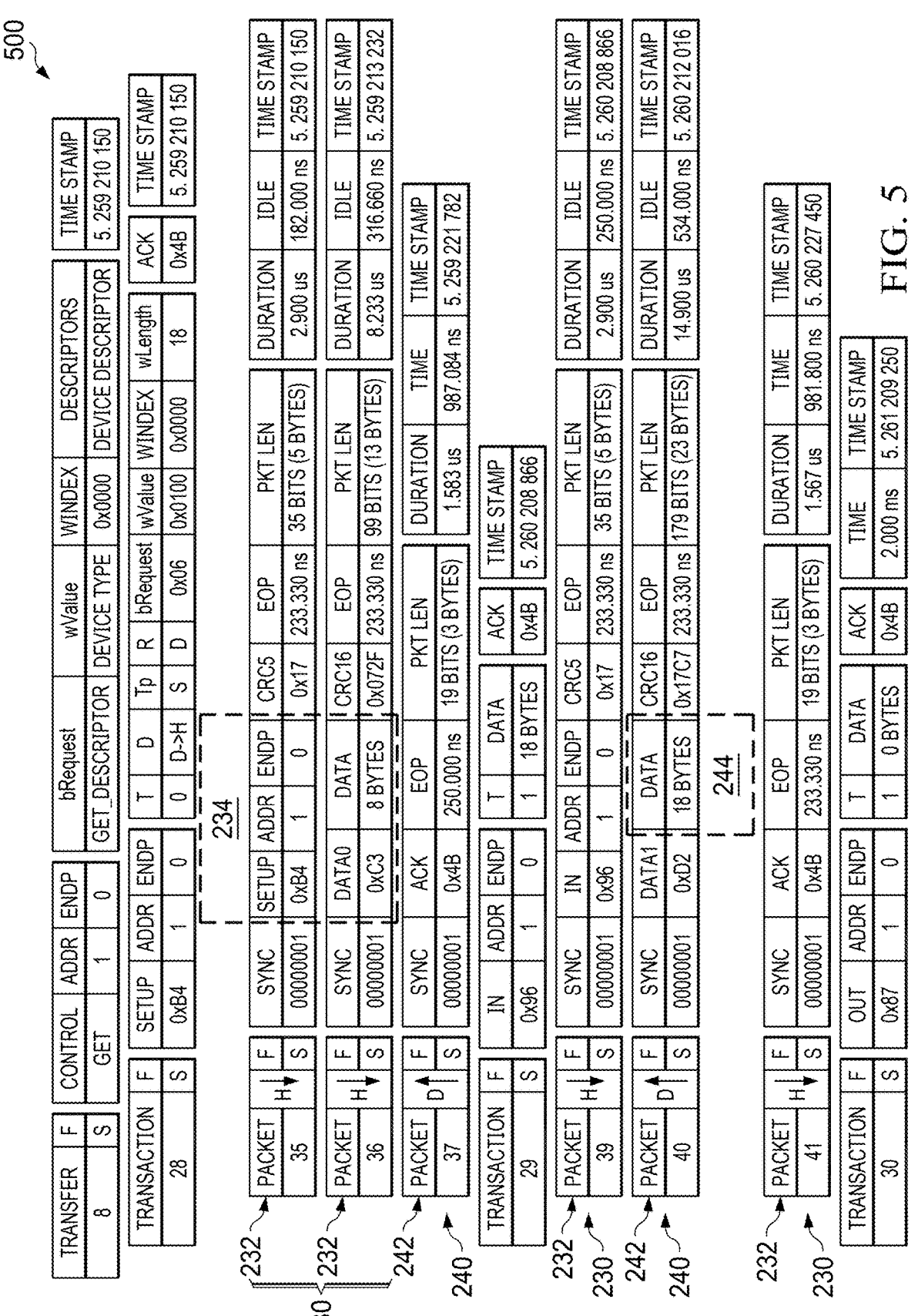
FIG. 5 shows an example series of USB transactions between a host and a USB device, illustrating an identification of specified host request data in a host request and corresponding specified device response data (e.g., a USB device descriptor) in a device response.

FIG. 5 shows an example series of USB transactions between the host 142 and the example USB device 140b shown in any of FIGS. 1-3, illustrating an identification of specified host request data 234 (in a host request 230) and corresponding specified device response data 244 (in a device response 240), e.g., by hub controller circuitry 124 using data specifying parameters 214 listed in the programmable lookup table 400.

The example series of USB transactions shown in FIG. 5 is a process by which the host 142 obtains a device descriptor from the USB device 140b, e.g., which device descriptor may be used by the host 142 to effectively communicate with the USB device 140b. As shown, the series of USB transactions includes a host request 230 including host request packets 232 (in particular, Packet #35 and Packet #36) that collectively include specified host request data 234 matching the data specifying parameters 214 listed in Entry 1 of the example lookup table 400 shown in FIG. 4. The specified host request data 234 includes a host command (encoded in the "Data" segment) requesting a device descriptor from a particular USB device, e.g., USB device 140b.

The host request 230 including host request packets 232 (including Packet #35 and Packet #36) is communicated from the upstream hub port 104 to both (a) the downstream hub port 106b (to which USB device 140b is connected via the downstream dock port 304b) and (b) the hub controller 108. The hub controller circuitry 124 may inspect received host request packets 232 (and received device response packets 242, as discussed below), including comparing data in respective host request packets 232 with data specifying parameters 214 listed in programmable lookup table 400. In this example, the hub controller circuitry 124 may identify that the information included in Packet #35 and Packet #36 matches the data specifying parameters 214 in Entry 1 of the example lookup table 400, wherein the identified information is referred to herein as specified host request data 234. As mentioned above, the specified host request data 234 identified in the host request 230 includes a host command requesting a device descriptor from USB device 140b.

In response to identifying the specified host request data 234 including the host command requesting a device descriptor, the hub controller circuitry 124 (which inspects received device response packets 242 from respective downstream hub ports 106a-106n) may (a) identify a response to the host command in a respective device response packet 242 received from downstream hub ports 106b, wherein the identified information (including the requested device descriptor of USB device 140b) is referred to herein as specified device response data 244, and (b) store the identified specified device response data 244 in device response memory 210. In some examples, the response to the host command may be located in the next "Data" payload received at the hub controller 108 from USB device 140b (via downstream hub port 106b, e.g., as specified by USB communication protocols).

In some examples, the hub controller circuitry 124 may store metadata or other associated data in addition to the payload raw data, i.e., wherein the payload raw data comprises the "Data" segment indicated at 244 in FIG. 5 (e.g., comprising the device descriptor of USB device 140b in this example).

Table 1 shows example types of metadata or data associated with the payload raw data (e.g., a USB device descriptor) that may be identified in a device response 240 and stored (along with the payload raw data) in device response memory 210 (e.g., a storage buffer or registers) as specified host request data 234.

TABLE 1

| Example data stored as specified host request data 234. | | |
| --- | --- | --- |
| Byte | Name | Description |
| 1:0 | Lookup Table Entry | Points to Lookup Table entry # that triggered the buffer |
| 2 | Port Source | Port number of the hub that the response was received |
| 4:3 | Device Address/ Route String | Storage of the device address/route string (for USB2, must be captured from the host request, not device response) |
| 6:5 | Total N Data Payload Packets | Total number of received packets to the command |
| 8:7 | Packet Data Payload Number | Packet number |
| 10:9 | Packet Data Payload Size | Length of Packet (i.e. "L0") |
| (L0 + 11):11 | Packet Data Payload Raw Data | Raw response from device |
| (L0 + 13): (L0 + 12) | Packet Data Payload Number | Packet number (if "Packet Number" > 1) |
| (L0 + 15): (L0 + 14) | Packet Data Payload Size | Length of Packet ("L1") (if "Packet Number" > 1) |
| (L0 + L1 + 16): (L0 + 16) | Packet Data Payload Raw Data | Raw response from device (if "Packet Number" > 1) |

FIG. 6 shown an example method 600 for identifying specified device response data 244 (e.g., USB device descriptors) from a device response 240 from a USB device 140b, storing the identified specified device response data 244 in memory, and providing access to the stored specified device response data 244 by an external device 310 (e.g., separate from the host 142 and USB devices 140a-140n). FIG. 6 may be understood with reference to the example dock device 300 shown in FIG. 3.

At 602, a host 142 connected to the upstream dock port 302 generates and transmits a host request 230 including a host command requesting a device descriptor from USB device 140b. At 604, the upstream hub port 104 receives and forwards the host request 230 via the routing system 220 of the USB hub 202 to both (a) the downstream hub port 106b (to which USB device 140b is connected via the downstream dock port 304b) and (b) the hub controller 108. In some examples (e.g., a USB2 implementation), the upstream hub port 104 may forward the host request 230 to downstream hub ports 106a-106n and to hub controller 108, whereas in other examples (e.g., a USB3 implementation), the upstream hub port 104 may forward the host request 230 to downstream hub port 106b (and not to other downstream hub ports 106a-106n) and to hub controller 108.

At 606, the hub controller circuitry 124 may identify data in the host request 230 that matches respective data specifying parameters 214 (e.g., listed in the example lookup table 400), wherein the identified information is referred to herein as specified host request data 234. The identified data (specified host request data 234) includes the host command requesting the device descriptor from USB device 140b.

At 608, the USB device 140b receives the host request 230 including the host command requesting a device descriptor. In response, the USB device 140b generates and transmits a device response 240 including a response to the host command, in particular including the requested device descriptor encoded as a data payload in a respective device response packet 242. At 610, the downstream hub port 106b receives and forwards the device response 240 via the routing system 220 of the USB hub 202 to both (a) the upstream hub port 104 and (b) the hub controller 108. Steps 608 and/or 610 may be performed in parallel with step 606, e.g., at the same time or partially overlapping in time.

At 612, in response to identifying the host command requesting the device descriptor (i.e., the specified host request data 234) at 606, the hub controller circuitry 124 may identify in the device response 240 the response to the host command, namely the data payload including the requested device descriptor. At 614, the hub controller circuitry 124 may store the identified data payload (device descriptor) and optionally metadata or other data associated with the data payload (e.g., any of the various data shown in Table 1 above) in device response memory 210, as specified device response data 244.

At 616, in response to identifying and storing the device descriptor of USB device 140b, the hub controller circuitry 124 may (optionally) communicate a notification to a processor 150 (e.g., a microcontroller), which in response may send a notification to the external device 310 and/or other external device(s), via any suitable wired and/or wireless communication links or network. In some examples, the notification may include the specified device response data 244 (including the device descriptor of USB device 140b); in other examples, the notification may indicate a device descriptor has been identified without including the device descriptor itself.

At 618, the dock device may provide access by an external device to the stored device descriptors identified and stored by the USB hub controller. As an example, external device 310 (e.g., operated by an IT agent) may communicate a request to the processor 150 to access device descriptor information regarding USB devices 140a-140n connected to the dock device 300. The processor 150 may create a communication link between the external device 310 and hub controller 108 allowing the external device 310 access to device descriptors (specified device response data 244) of respective USB devices 140a-140n. In this manner, the external device 310 may learn information about the USB devices 140a-140n connected to the dock device 300, for example to identify a malicious or unauthorized device or type of device.

Although example embodiments have been described above, other variations and embodiments may be made from this disclosure without departing from the spirit and scope of these embodiments.

The invention claimed is:

1. An apparatus, comprising:
an upstream hub port;
a plurality of downstream hub ports;
a hub controller;
a device response memory accessible to the hub controller;
a routing system connecting (a) the upstream hub port to the plurality of downstream hub ports, (b) the upstream hub port to the hub controller, and (c) respective downstream hub ports to the hub controller;
wherein the routing system to:
    communicate host requests from the upstream hub port to (a) respective downstream hub ports and (b) the hub controller; and
    communicate respective device responses from respective downstream hub ports to (a) the upstream hub port and (b) the hub controller, wherein the respective device responses are responsive to respective host requests; and
the hub controller including hub controller circuitry to:
    receive, from a respective downstream hub port, a respective device response responsive to a respective host request;
    identify device response data in the respective device response received from the respective downstream hub port and responsive to the respective host request; and
    store the identified device response data in the device response memory.

2. The apparatus of claim 1, comprising a parameter memory storing a lookup table including data specifying parameters; and
wherein the hub controller circuitry to:
    use the data specifying parameters to identify specified host request data in a respective host request; and
    identify the device response data in a respective device response in response to identifying the specified host request data in the respective host request.

3. The apparatus of claim 1, wherein the apparatus comprises a USB2 hub.

4. The apparatus of claim 1, wherein the apparatus comprises a USB3 hub.

5. The apparatus of claim 1, comprising a processor connected to the hub controller, the processor having access to the device response data stored in the device response memory.

6. The apparatus of claim 5, comprising a network interface connected to the processor, the network interface allowing access to the device response data independent from the upstream hub port and independent from the plurality of downstream hub ports.

7. The apparatus of claim 5, wherein the processor comprises a microcontroller.

8. The apparatus of claim 1, wherein the device response data comprises identification information of a USB device connected to the respective downstream hub port.

9. The apparatus of claim 1, wherein the apparatus comprises a dock device including:
a USB hub including the upstream hub port, the plurality of downstream hub ports, the hub controller, the device response memory accessible to the hub controller, and the routing system; and
a processor connected to the hub controller, the processor having access to the device response data stored in the device response memory.

10. An apparatus, comprising:
a Universal Serial Bus (USB) hub comprising:
    an upstream hub port;
    a plurality of downstream hub ports;
    a hub controller;
    a device response memory accessible to the hub controller;
    a routing system connecting (a) the upstream hub port to the plurality of downstream hub ports and (b) respective downstream hub ports to the hub controller;
    wherein the routing system to communicate device responses from respective downstream hub ports to the hub controller; and
    the hub controller including hub controller circuitry to:
        receive, from a respective downstream hub port, a respective device response responsive to a host request received from the upstream hub port;
        identify specified device data in the respective device response received from the respective downstream hub port; and
        store the specified device data in the device response memory.

11. The apparatus of claim 10, wherein the hub controller circuitry to:
use data specifying parameters to identify specified host request data in the host request received from the upstream hub port; and
identify the specified device response in the respective device response in response to identifying the specified host request data in the respective host request.

12. The apparatus of claim 10, comprising:
a processor connected to the hub controller, the processor having access to the specified device data stored in the device response memory; and
a network interface connected to the processor, the network interface allowing access to the specified device data.

13. The apparatus of claim 12, wherein the processor has access to the specified device data stored in the device response memory independent from the upstream hub port and independent from the plurality of downstream hub ports.

14. The apparatus of claim 12, wherein the processor comprises a microcontroller.

15. The apparatus of claim 10, wherein the data comprises identification information of a USB device connected to the respective downstream hub port.

16. A method comprising:
receiving, at a downstream hub port of a Universal Serial Bus (USB) hub, a device response from a USB device connected to the downstream hub port, wherein the device response is responsive to a host request from a host connected to an upstream hub port of the USB hub;
forwarding the device response responsive to the host request from the downstream hub port to (a) the upstream hub port and (b) a hub controller of the USB hub;
identifying, by the hub controller, specified device response data in the device response responsive to the host request; and
storing the specified device response data in a device response memory connected to the hub controller.

17. The method of claim 16, comprising
prior to forwarding the device response, forwarding the host request from the upstream hub port to (a) the downstream hub port and (b) the hub controller; and

US 12,688,136 B2

17

18 wherein identifying, by the hub controller, the specified
device response data included in the device response
responsive to the host request comprises:
identifying, by the hub controller, specified host request
data in the host request; and
identifying the specified host request data in the device
response in response to identifying the specified host
request data in the host request.

18. The method of claim 16, comprising:
accessing the specified device response data, stored in the
device response memory, by a microcontroller con-
nected to the hub controller; and
allowing access to the stored device response data, by the
microcontroller, to a device connected to the micro-
controller independent of the upstream hub port and the
downstream hub port.

19. The method of claim 16, wherein the specified device
response data comprises identification information of the
USB device connected to the downstream hub port.

20. The apparatus of claim 12, wherein the specified
device data comprises identification information of a USB
device connected to the respective downstream hub port.

* * * * *